(12) United States Patent
Schütz

(10) Patent No.: US 10,676,266 B2
(45) Date of Patent: Jun. 9, 2020

(54) TAPPING VALVE WITH A PLASTIC VALVE HOUSING FOR SHIPPING AND STORAGE TANKS FOR LIQUIDS

(75) Inventor: Udo Schütz, Selters/Westerwald (DE)

(73) Assignee: PROTECHNA S.A., Fribourg (CH)

( * ) Notice: Subject to any disclaimer, the term of this patent is extended or adjusted under 35 U.S.C. 154(b) by 836 days.

(21) Appl. No.: 12/460,894

(22) Filed: Jul. 24, 2009

(65) Prior Publication Data
US 2010/0044612 A1 Feb. 25, 2010

(30) Foreign Application Priority Data
Aug. 20, 2008 (DE) .................. 10 2008 038 546

(51) Int. Cl.
*B67D 7/32* (2010.01)
*B65D 77/04* (2006.01)
*H05F 3/00* (2006.01)

(52) U.S. Cl.
CPC ....... *B65D 77/0466* (2013.01); *B67D 7/3236* (2013.01); *B01D 2201/50* (2013.01); *B65D 2213/02* (2013.01); *H05F 3/00* (2013.01)

(58) Field of Classification Search
CPC ............ B65D 2213/02; B65D 77/0466; B67D 7/3236; B29L 2031/7126; F16L 25/01; B01D 2201/50; B64D 37/32; B64D 45/02; H05F 3/02; H05F 1/00; H05F 3/00
USPC ......... 251/144; 137/560; 174/51, 78, 17 LG, 174/17 GF, 5 SG, 21 R, 47, 549; 361/212–224; 222/105, 545, 568; 206/386, 524.3, 600, 524.9; 439/92, 439/95–97, 386; 220/1.6, 4.12, 4.13, 4.1, 220/88.1, 23.87, 23.91
See application file for complete search history.

(56) References Cited

U.S. PATENT DOCUMENTS

| | | | | |
|---|---|---|---|---|
| 4,689,271 A * | 8/1987 | Schittenhelm et al. | ...... | 428/446 |
| 5,201,493 A * | 4/1993 | Kim | ........................ | 251/315.05 |
| 6,156,969 A | 12/2000 | Schütz | | |
| 6,841,883 B1 * | 1/2005 | Farnworth et al. | ........... | 257/777 |
| 7,151,657 B2 | 12/2006 | Schütz | | |
| 7,159,718 B2 * | 1/2007 | Cassina | ...................... | 206/524.3 |
| 7,353,967 B2 * | 4/2008 | Hamm | ...................... | 220/495.01 |
| 7,762,528 B2 * | 7/2010 | Butruille | ...................... | 251/305 |
| 7,866,498 B2 * | 1/2011 | Cassina | ...................... | 220/4.13 |
| 7,908,980 B2 * | 3/2011 | Schmidt et al. | ........... | 108/57.25 |

(Continued)

FOREIGN PATENT DOCUMENTS

DE 198 15 082 10/1999

OTHER PUBLICATIONS

Indian Examination Report dated Aug. 27, 2014 in English.

*Primary Examiner* — Hailey K. Do
(74) *Attorney, Agent, or Firm* — King & Schickli, PLLC

(57) ABSTRACT

A tapping valve with a plastic valve housing for shipping and storage tanks for liquids, which are equipped with an inner tank with a filling socket and a drain socket for connecting the tapping valve, an outer jacket of a metal cage or sheet metal, and a pallet-like metal support frame. The tapping valve is screwed by means of the inlet socket of the valve housing onto a connecting flange, which is designed as a threaded flange, is made of an electrically conductive plastic material, and is welded onto the drain socket of the inner tank. The connecting flange of the valve housing is connected with the support frame or the outer jacket of the shipping and storage tank by an electric grounding conductor.

16 Claims, 4 Drawing Sheets

(56) References Cited

U.S. PATENT DOCUMENTS

| | | | |
|---|---|---|---|
| 2003/0111465 A1* | 6/2003 | Hamm | 220/3.2 |
| 2004/0124387 A1* | 7/2004 | Schutz | 251/148 |
| 2006/0011637 A1* | 1/2006 | Schmidt | B29C 65/02 |
| | | | 220/601 |

* cited by examiner

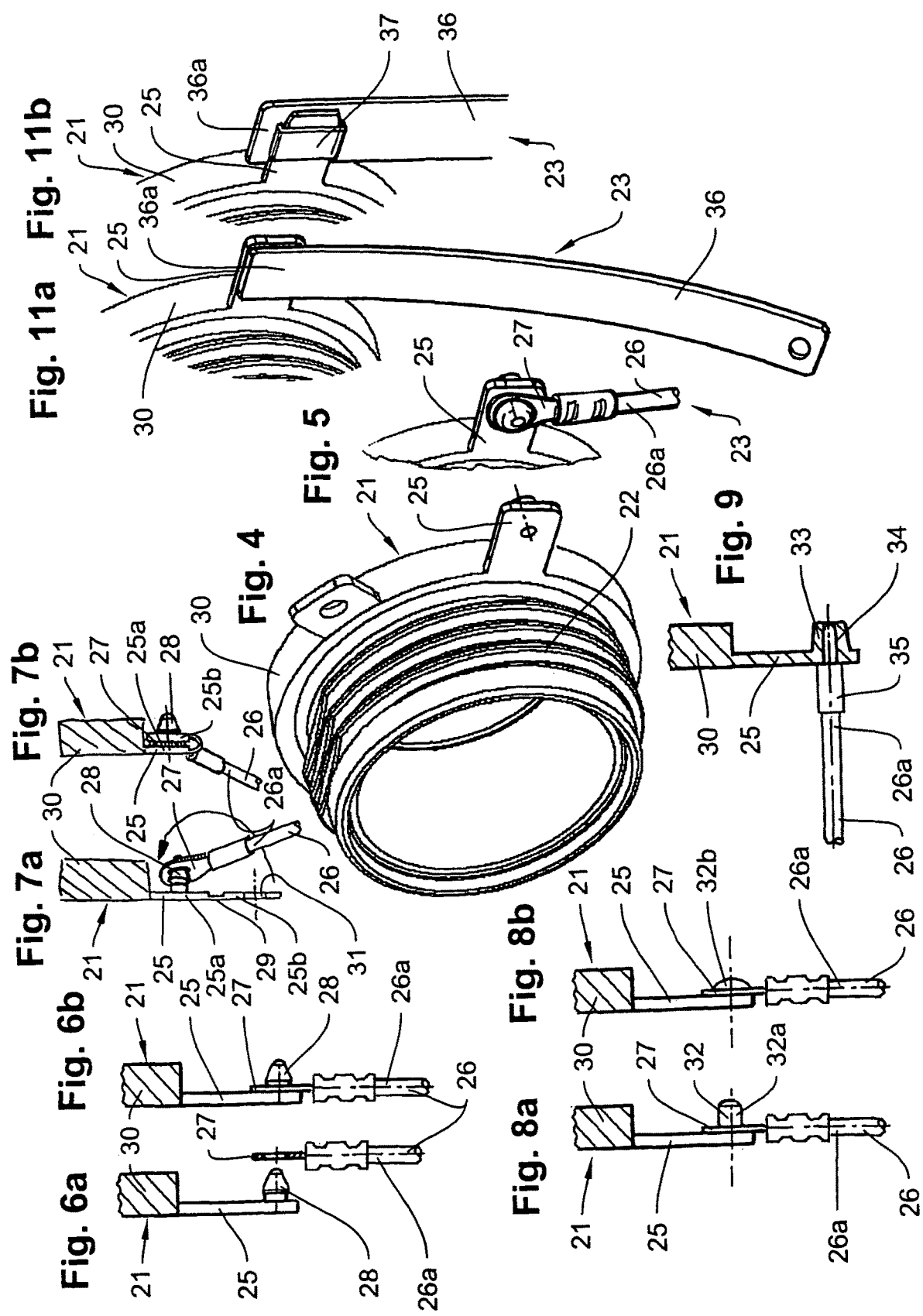

TAPPING VALVE WITH A PLASTIC VALVE HOUSING FOR SHIPPING AND STORAGE TANKS FOR LIQUIDS

BACKGROUND OF THE INVENTION

1. Field of the Invention

The present invention relates to a tapping valve with a plastic valve housing, especially a flap valve or ball valve, for shipping and storage tanks for liquids, which are equipped with a plastic inner tank with a closable filling socket and a drain socket for connecting the tapping valve, an outer jacket that consists of a metal cage or sheet metal, and a pallet-like support frame made of metal or an at least partially electrically conductive plastic for supporting the inner tank.

2. Description of the Related Art

In a shipping and storage tank for liquids that is described in DE 198 15 082 A1, a grounding part is installed in the tapping valve of the general type in question, which is mounted on the outlet socket of the inner tank. The grounding part is designed as a bent metal sheet or small metal plate, which extends over a section of the inside borehole of the tapping valve and is attached by a fastening screw and a grounding cable to the support frame of the tank.

This tapping valve has the following disadvantages:

The fastening screw, which is screwed through the wall of the valve housing and is necessary for mounting the metal sheet or small metal plate in the plastic valve housing, does not guarantee the tightness of the valve. The use of metal parts is not allowed in shipping and storage tanks for certain liquid foods. Therefore, tanks equipped with this valve cannot be used to hold these kinds of liquid foods. Finally, when aggressive liquids are shipped or stored in previously known liquid tanks, there is the danger that the grounding part will be damaged in such a way that the electrical grounding will no longer be able to function properly.

Moreover, tapping valves for liquid tanks are known which have a housing that has been provided with antistatic properties. Tapping valves of this type are too expensive for bulk products.

SUMMARY OF THE INVENTION

Therefore it is the object of the invention to further develop the tapping valve of the general type described above for shipping and storage tanks with respect to safe and complete grounding to carry away the electric charges that form as a result of fluid friction during the filling of the tank with liquids and during the tapping of liquids, and with respect to inexpensive manufacture.

In accordance with the invention, this object is met by a tapping valve for shipping and storage tanks for liquids, especially a flap valve or ball valve, for shipping and storage tanks for liquids, which are equipped with a plastic inner tank with a closable filling socket and a drain socket for connecting the tapping valve, an outer jacket composed of a metal cage or sheet metal, and a pallet-like support frame of metal or an at least partially electrically conductive plastic for supporting the inner tank. A connecting flange, which is designed as a threaded flange and is completely or partially produced from electrically conductive plastic material; onto which the valve housing is screwed with the inlet socket; and with which the valve housing is welded onto the drain socket of the inner tank. Electrical grounding of the tapping valve is provided by a grounding conductor, which connects the connecting flange of the valve housing with the support frame or the outer jacket of the shipping and storage tank.

The tapping valve of the invention has a housing that is furnished with a connecting flange made of an electrically conductive plastic for welding the housing onto the drain socket of the plastic inner tank of a liquid shipping and storage tank that is equipped with an outer jacket that consists of a metal cage or sheet metal and with a pallet-like support frame that is made of an electrically conductive material. This tapping valve allows safe electrical grounding of the liquid draining during the emptying of the inner tank by an electric grounding conductor, which connects the connecting flange with the pallet-like support frame or the outer jacket. The tapping valve with the connecting flange made of electrically conductive plastic is much less expensive than the prior-art tapping valve, whose entire plastic housing has been provided with antistatic properties.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

Figure 1:
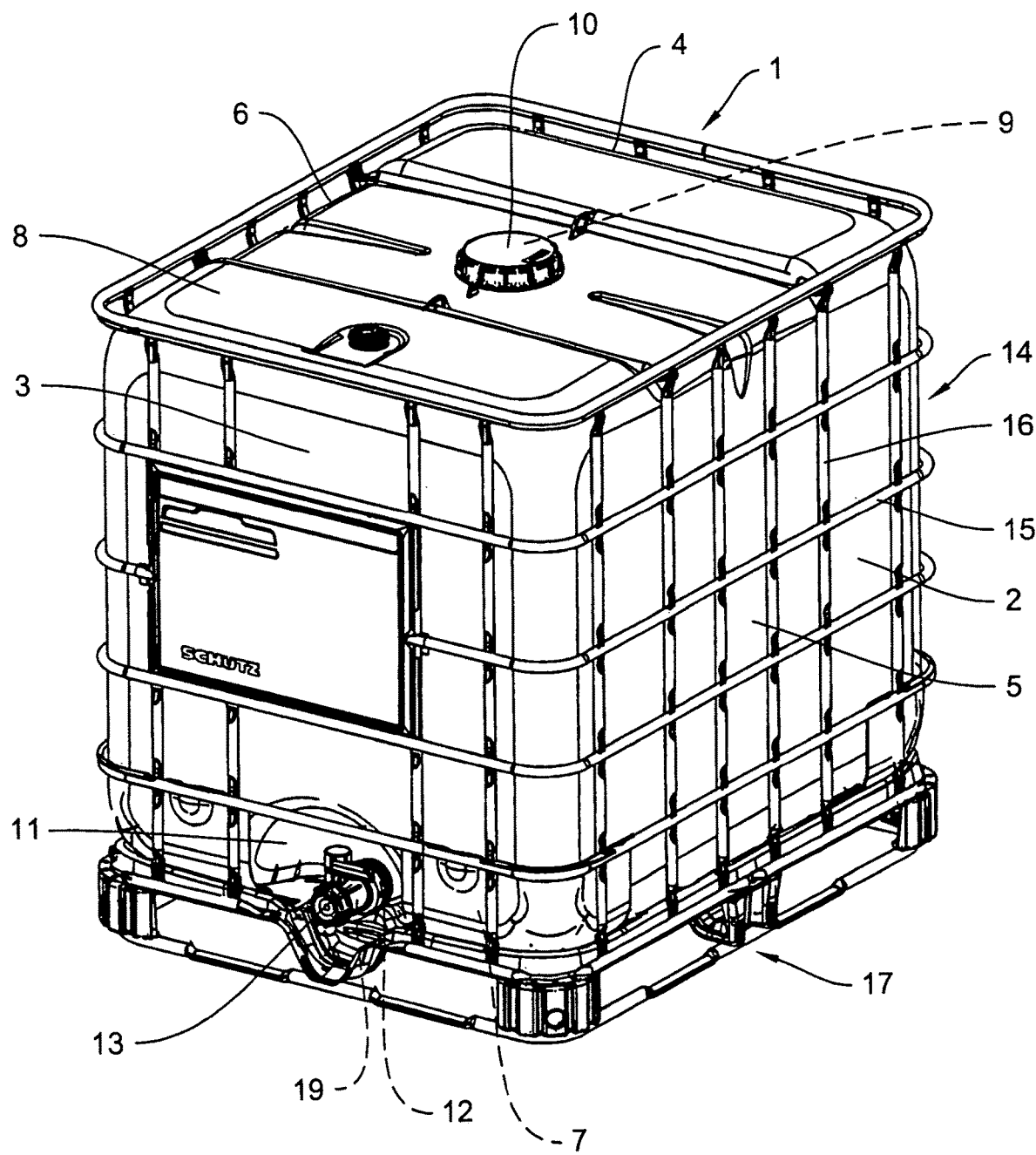

IN THE DRAWING:

FIG. 1 is a perspective view of a shipping and storage tank for liquids.

Figure 2:
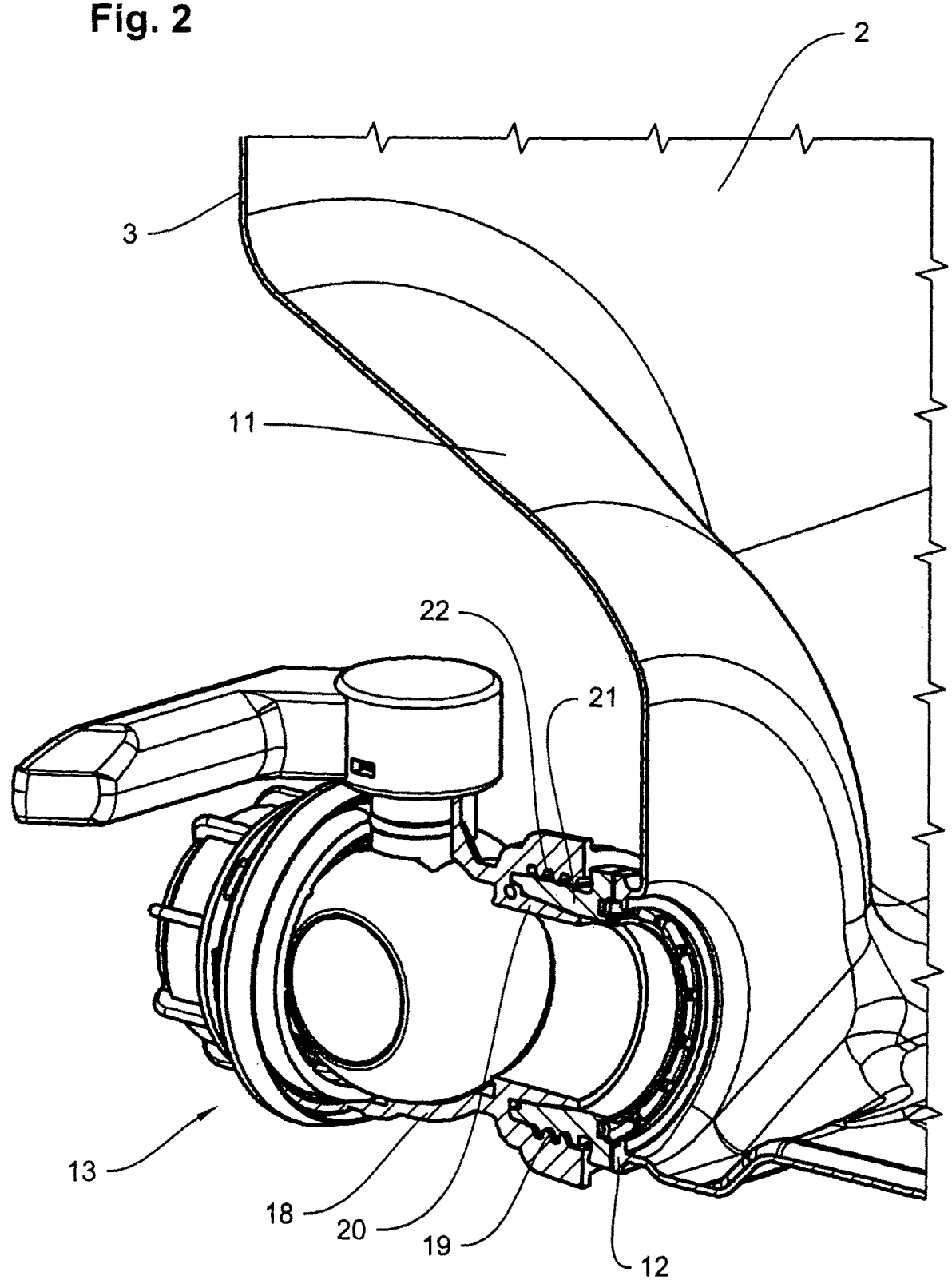

FIG. 2 is a perspective, partially cutaway, enlarged view of the tapping valve, which is welded by means of a connecting flange onto the drain socket of the inner tank of the shipping and storage tank.

Figure 3:
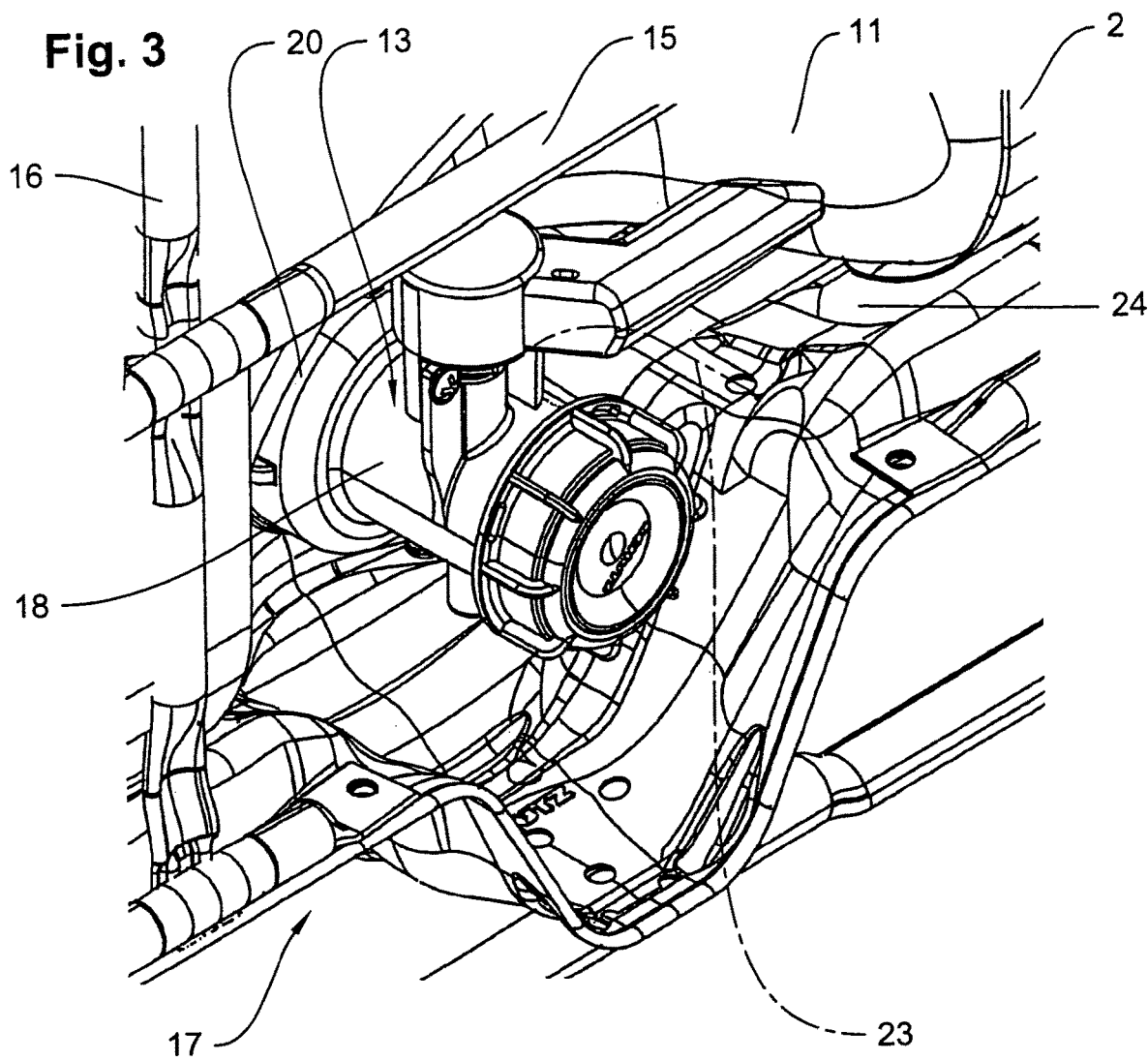

FIG. 3 is an enlarged perspective view of the outlet area of the shipping and storage tank with the tapping valve.

FIG. 4 is an enlarged perspective view of the connecting flange of the tapping valve.

FIGS. 5, 6a, 6b, 7a, 7b, 8a, 8b, and 9 show various means of fastening an electric grounding cable to a tongue of the connecting flange.

Figure 10:
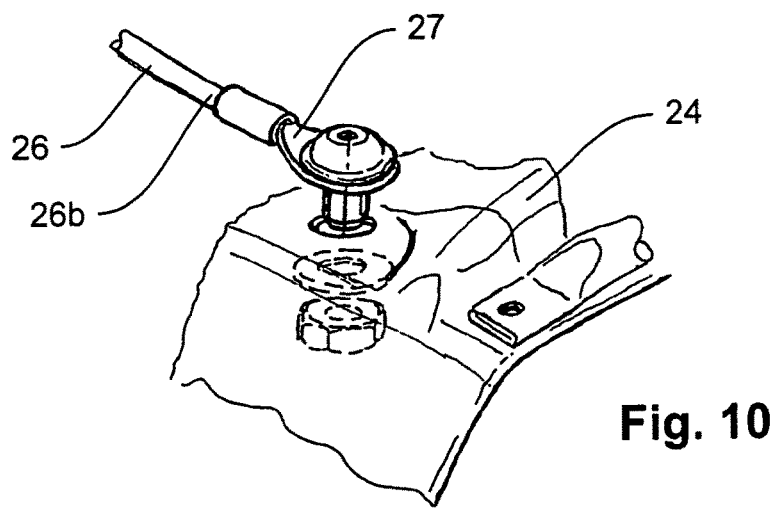

FIG. 10 shows a means of fastening the grounding cable to the base pan of the pallet-like support frame of the shipping and storage tank.

FIGS. 11a and 11b show two possibilities for fastening an electric grounding strip element to the connecting flange of the tapping valve.

DETAILED DESCRIPTION OF THE INVENTION

The shipping and storage tank 1 for liquids that is shown in FIG. 1, which can be used as a disposable or reusable tank, has as its principal components (1) a replaceable rectangular-solid plastic inner tank 2 with a front wall 3, a rear wall 4, and two sidewalls 5, 6, with a lower base 7 designed as a drain base and an upper base 8, with a filling socket 9 that is formed on the upper base 8 and can be closed with a cap 10, and with a drain socket 12, which is formed on a dome-shaped recess 11 in the lower section of the front wall 3 of the inner tank 2, is produced as a single part with the inner tank 2 by blow molding, and serves to mount a tapping valve 13, especially a flap valve or a ball valve; (2) an outer jacket 14 in the form of a cage, which consists of intersecting horizontal and vertical metal cage bars 15, 16, for holding the inner tank 2; and (3) a pallet-like support frame 17 with standard European dimensions of length and width for supporting the plastic tank 2.

The injection-molded high-density polyethylene (HDPE) valve housing 18 of the tapping valve 13 is screwed onto a connecting flange 21, which has an external thread 22, with the inlet socket 20, which has a corresponding internal thread 19, and is sealed against it, and the connecting flange 21, together with the tapping valve 13 screwed onto it, is mounted on the drain socket 12 of the inner tank 2, preferably by butt welding with heat reflectors. The connecting flange 21 is manufactured as an injection-molded part from an electrically conductive plastic, for example, polyethylene with carbon or nanoparticles (FIG. 2).

The tapping valve 13 is equipped with an electric grounding by a grounding conductor 23, which connects the connecting flange 21 of the valve housing 18 with the trough like base 24 of the metallic support frame 17 (FIG. 3).

A tongue 25 injected-molded on the flange ring 30 of the connecting flange 21 is used to fasten the grounding conductor 23 to the flange ring 30 (FIG. 4). The tongue 25 is freely accessible in the mounted state of the tapping valve 13.

FIGS. 5 to 9 show various means of fastening the grounding conductor 23, which is realized as an electric cable 26, to the tongue 25 on the flange ring 30 of the connecting flange 21.

According to FIG. 5, the end 26a of the electric grounding cable 26 has a ring terminal 27, by which it is screwed onto the fastening tongue 25 of the connecting flange illustrated in FIG. 4.

FIGS. 6a and 6b illustrate the clipping of the ring terminal 27 of the grounding cable 26 onto a mushroom-shaped pin 28 of the fastening tongue 25 on the flange ring 30 of the connecting flange 21.

In the fastening means illustrated in FIGS. 7a and 7b, the fastening tongue 25 of the connecting flange 21 is divided into two sections 25a, 25b by a predetermined bending point 29. The section 25a adjacent to the flange ring 30 of the connecting flange 21 has a mushroom-shaped pin 28, and the free section 25b has a fastening hole 31. To fasten the end 26a of the grounding cable 26, its ring terminal 27 is placed on the pin 28 on the section 25a of the fastening tongue 25, and the free section 25b of the tongue 25 is bent over and clipped onto the pin 28, so that the ring terminal 27 of the cable 26 is clamped between the two tongue sections 25a, 25b of the tongue 25 of the connecting flange 21.

FIGS. 8a and 8b illustrate another type of fastening, in which the ring terminal 27 at one end 26a of the grounding cable 26 is placed on a smooth pin 32 on the tongue 25 on the flange ring 30 of the connecting flange 21, and the end 32a of the pin that projects beyond the ring terminal 27 is fused and deformed into a rivet head 32b.

In the possible fastening means shown in FIG. 9, the pin 33 on the fastening tongue 25 of the connecting flange 21 has a drill hole 34 for a plug 35 mounted on one end 26a of the grounding cable 26.

According to FIG. 10, the other end 26b of the grounding cable 26 can be bolted on the sheet-metal base 24 of the support frame 17 by means of a ring terminal 27 mounted on the grounding cable 26. It is also possible to fasten the grounding cable 26 on the sheet-metal base 24 of the support frame 17 by the fastening means illustrated in FIGS. 6a, 6b; 7a, 7b; 8a, 8b; and 9.

In addition, it is possible to fasten the end 26b of the grounding cable 26 to the outer cage 14 of the shipping and storage tanks.

FIGS. 11a and 11b illustrate the realization of the grounding conductor 23 as an electrically conductive strip element 36 made of plastic or metal. As shown in FIG. 11a, one end 36a of the strip element 36 can be welded or adhesively bonded to the tongue 25 on the flange ring 30 of the connecting flange 21 of the tapping valve 13. In addition, it is possible to attach the strip element 36 to the tongue 25 of the connecting flange 21 by riveting, bolting or clinching.

In the type of fastening shown in FIG. 11b, the end 36a of the strip element 36 has a bracket 37 by which it can be mounted on the tongue 25 on the flange ring 30 of the connecting flange 21.

In another embodiment of the tapping valve 13, the part of the connecting flange 21 that comes into contact with the liquid running out of the shipping and storage tank 1 during the operation of emptying the tank is made of a plastic with an electrically conductive additive, while the remaining part of the connecting flange is made of pure plastic. The manufacturing costs of the tapping valve of the shipping and storage tank are reduced by a connecting flange of this type.

While specific embodiments of the invention have been shown and described in detail to illustrate the inventive principles, it will be understood that the invention may be embodied otherwise without departing from such principles.

I claim:

1. A tapping valve for a shipping and storage tank for liquids, wherein the shipping and storage tanks are equipped with a plastic inner tank with a closable filling socket and a drain socket for connecting the tapping valve, an outer jacket of a metal cage or sheet metal, and a pallet-like support frame of metal or an at least partially electrically conductive plastic for supporting the plastic inner tank, the tapping valve comprising:

a plastic valve housing comprising an inlet socket with a longitudinal axis, said inlet socket including a first projection being annular in shape and extending along the longitudinal axis, said first projection including an interior threaded surface;

a connecting flange comprising:

an annular flange extending along the longitudinal axis, said annular flange received within the first projection, and including an exterior threaded surface mating with the interior threaded surface of the first projection; and a substantially cylindrical flange ring directly abutting and extending radially outward from the annular flange, said substantially cylindrical flange ring being directly welded onto the drain socket of the plastic inner tank;

wherein the connecting flange comprises an electrically conductive plastic material; and a grounding conductor directly connected to the connecting flange and adapted to connect the connecting flange to the pallet-like support frame or the outer jacket of the shipping and storage tank, thereby electrically grounding the connecting flange to the pallet-like support frame or the outer jacket of the shipping and storage tank;

wherein the plastic valve housing is adapted to be connected to and disconnected from the connecting flange without disconnecting the grounding conductor from the substantially cylindrical flange ring, thereby maintaining electrical grounding between the connecting flange and the pallet-like support frame or the outer jacket of the shipping and storage tank through connection and disconnection of the plastic valve housing.

2. The tapping valve in accordance with claim 1, wherein the electrically conductive plastic material comprises polyethylene with carbon.

3. The tapping valve in accordance with claim 1, wherein the electrically conductive plastic material comprises polyethylene with nanoparticles.

4. The tapping valve of claim 1, wherein the grounding conductor is directly connected to the substantially cylindrical flange ring at a position external to the connecting flange in an assembled condition.

5. The tapping valve of claim 1, wherein the inlet socket further includes a second projection radially inward from the first projection, and wherein the annular flange is received between the first projection and the second projection, with an interior surface of the annular flange being in contact with an exterior surface of the second projection of the inlet socket.

6. The tapping valve of claim 5, wherein the plastic valve housing is injection-molded to form a first unitary body.

7. The tapping valve of claim 6, wherein the connecting flange is injection-molded to form a second unitary body.

8. The tapping valve of claim 1, wherein the substantially cylindrical flange ring further includes a tongue extending radially outward from the substantially cylindrical flange ring, said tongue adapted for engaging the grounding conductor.

9. The tapping valve of claim 8, wherein the tongue includes a first section and a second section, wherein the tongue is adapted to receive a portion of the grounding conductor between the first section and the second section.

10. The tapping valve of claim 8, wherein the grounding conductor includes a plug and the tongue includes an aperture adapted to receive the plug.

11. The tapping valve of claim 8, wherein the tongue includes a pin adapted to be received within an aperture of the grounding conductor.

12. The tapping valve of claim 11, wherein the pin is mushroom-shaped.

13. The tapping valve of claim 11, wherein the pin is adapted to be deformable into a rivet head to engage the grounding conductor.

14. The tapping valve of claim 8, wherein the grounding conductor comprises a flat, electrically conductive strip element.

15. The tapping valve of claim 14, wherein the flat, electrically conductive strip element is welded or adhesively bonded to the tongue.

16. The tapping valve of claim 14, wherein the tongue includes a bracket adapted to receive the flat, electrically conductive strip element.

* * * * *